(12) United States Patent
Rudin et al.

(10) Patent No.: US 12,027,810 B2
(45) Date of Patent: Jul. 2, 2024

(54) SOLID-STATE LASERS AND ASSEMBLY METHOD THEREFOR

(71) Applicant: MENHIR PHOTONICS AG, Glattbrugg (CH)

(72) Inventors: Benjamin Rudin, Glattbrugg (CH); Florian Emaury, Glattbrugg (CH); Roger Valentin, Glattbrugg (CH)

(73) Assignee: MENHIR PHOTONICS AG, Glattbrugg (CH)

( * ) Notice: Subject to any disclaimer, the term of this patent is extended or adjusted under 35 U.S.C. 154(b) by 106 days.

(21) Appl. No.: 17/635,504

(22) PCT Filed: Aug. 4, 2020

(86) PCT No.: PCT/EP2020/071852
§ 371 (c)(1),
(2) Date: Feb. 15, 2022

(87) PCT Pub. No.: WO2021/032462
PCT Pub. Date: Feb. 25, 2021

(65) Prior Publication Data
US 2022/0278495 A1    Sep. 1, 2022

(30) Foreign Application Priority Data

Aug. 16, 2019    (EP) .................................. 19192045

(51) Int. Cl.
*H01S 3/02*    (2006.01)
*H01S 3/034*    (2006.01)
(Continued)

(52) U.S. Cl.
CPC .............. *H01S 3/025* (2013.01); *H01S 3/034* (2013.01); *H01S 3/0401* (2013.01); *H01S 3/042* (2013.01);
(Continued)

(58) Field of Classification Search
CPC .................................. H01S 3/025; H01S 3/027
See application file for complete search history.

(56) References Cited

U.S. PATENT DOCUMENTS 5,170,409 A * 12/1992 Nightingale ............ H01S 3/025
372/101
6,130,902 A * 10/2000 Shimoji .................. H01S 3/042
372/34
(Continued)

FOREIGN PATENT DOCUMENTS

CN    113745969 A * 12/2021
EP    0512816 A2    11/1992
(Continued)

OTHER PUBLICATIONS

Shoji et al; Ultra-low-noise monolithic mode-locked solid-state laser; Optica, vol. 3, No. 9 / Sep. 2016 pp. 995-998.

*Primary Examiner* — Tod T Van Roy
(74) *Attorney, Agent, or Firm* — Nemphos Braue LLC; Michael Antone

(57) ABSTRACT

A quasi-monolithic solid-state laser in which the optical components of the laser cavity are bonded to a common substrate via mounts. The optical components and their mounts are fixedly connected to each other and to the substrate by bonding. While the gain medium is bonded to a mount made of a different material with high thermal conductivity for heat sinking, the cavity's lens and mirror components and their mounts are all made of the same material as the substrate, or a different material that is thermally matched to the substrate, and fixedly mounted on the substrate solely with bonding. The bonding is achieved with adhesive bonding, or some other form of bonding such as molecular bonding, chemically activated direct bonding or hydroxide catalysis bonding.

23 Claims, 9 Drawing Sheets

(51) Int. Cl.
  *H01S 3/04*    (2006.01)
  *H01S 3/042*   (2006.01)
  *H01S 3/06*    (2006.01)
  *H01S 3/091*   (2006.01)
  *H01S 3/1118*  (2023.01)

(52) U.S. Cl.
  CPC ............ *H01S 3/0627* (2013.01); *H01S 3/091* (2013.01); *H01S 3/0405* (2013.01); *H01S 3/1118* (2013.01)

(56) References Cited

U.S. PATENT DOCUMENTS

| | | | |
|---|---|---|---|
| 11,271,357 B2* | 3/2022 | Bauer | H01S 3/0405 |
| 2014/0286364 A1* | 9/2014 | Pronin | H01S 3/0813 |
| | | | 372/18 |
| 2015/0003486 A1* | 1/2015 | Kruse | H01S 3/08 |
| | | | 65/36 |
| 2022/0278495 A1* | 9/2022 | Rudin | H01S 3/0401 |

FOREIGN PATENT DOCUMENTS

| | | |
|---|---|---|
| WO | 9945612 A1 | 9/1999 |
| WO | 20170189060 A1 | 11/2017 |

\* cited by examiner

SOLID-STATE LASERS AND ASSEMBLY METHOD THEREFOR

CROSS-REFERENCE TO RELATED APPLICATIONS

This application is a national stage application filed under 35 USC 371, which claims the benefit of and priority to PCT Application No. PCT/EP2020/071852 filed 2020 Aug. 4, which claims the benefit of and priority to EP Patent Application No. 19192045.3 filed 2019 Aug. 16, each of which is hereby incorporated by reference in its entirety.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

Field of the Invention

The invention relates to solid-state lasers, more especially but not exclusively to ultrafast solid-state lasers.

A solid-state laser is a laser based on a solid-state gain medium arranged within a resonator cavity, where the gain medium is in the form of a bulk element, such as a block or rod, of solid-state material. The material is usually a glass or a crystal, but in some cases is a ceramic material. The term solid-state laser is not used to include fibre lasers, even though an optical fibre is typically a glass. For ultrafast solid-state lasers popular gain media include Er:Yb co-doped phosphate glass and Yb:KYW or Yb:KGW tungstate crystals. For a mode-locked laser, an additional component is a saturable absorber which is often implemented as a semiconductor saturable absorber mirror (SESAM) which integrates a saturable absorbing medium such as a quantum well with a Bragg reflector. Other kinds of saturable absorbers can be used, such as absorbers based on carbon nanotubes or other fullerenes. Typically, ultrafast solid-state lasers are pumped by laser diodes. The pump laser is usually mechanically separate from the ultrafast solid-state laser, with the pump beam being delivered via an optical fibre or through free space. Instead of a laser diode for the pump source, a continuous-wave solid-state laser may be used, which is often the case for a titanium-sapphire laser.

An ultrafast laser is a laser that is operable to generate pulses with pulse durations of femtoseconds or picoseconds. Types of ultrafast laser include mode-locked lasers, Q-switched lasers and gain-switched lasers. A typical range of pulse durations is from 5 fs to 100 ps. Most lasers of this kind are mode-locked, but sometimes also Q-switching or gain-switching can produce ultrashort pulses in this pulse duration range. Typical pulse repetition rates range from a few MHz to many GHz.

Conventionally, ultrafast solid-state lasers are built from discrete optical elements, such as mirrors, lenses, a gain medium element and a saturable absorber. These optical components are adhesive bonded or clamped into optic mounts which are commonly made of metal. The most commonly used metal for optic mounts is aluminium, but sometimes stainless steel or copper is used. Some of the optic mounts may be adjustable via adjustment-screws to aid laser alignment and re-alignment during set-up and use. Other optic mounts might be rigid. The optic mounts are usually fixed with screws or bolts to a support element which in turn is mounted on a base plate, which may be made of aluminium or Invar, for example.

Lasers constructed in this way are usually designed to operate only within a narrow temperature range and are thus provided with a temperature regulation system. Some are designed to operate the laser at an operating temperature well above ambient temperature, which requires heating, whereas others are designed to operate the laser at ambient temperature or at a temperature lower than ambient temperature, which both require cooling. If the temperature of the laser is not controlled to meet specification, misalignment of the optics occurs owing to absolute and differential thermal expansion and contraction effects, such as lengthening of the laser cavity by heating. Mechanical stress can also build up, e.g. when two parts are connected by screws, and this stress can be suddenly released in response to an external shock, vibration or a change in temperature, which leads to small movements of the optical components and consequent misalignment. Adhesively bonded components can also deform over time if they are temperature cycled many times owing to differential thermal expansion and contraction causing small long-term changes in the optical alignment of the laser, or may even detach or break due to thermally induced stresses.

EP 0 512 816 A2 discloses a quasi-monolithic laser based on a fused silica support plate. The various resonator components including mirrors, lenses, a Nd:YAG gain medium element encased in a Faraday magnet, and a KTP second harmonic generator are bonded via UV-curable adhesive to the fused silica base plate, some components being directly bonded to the base plate and others via optic mounts. The optic mounts are variously made of aluminium, BG40 Schott glass and fused silica. The low coefficient of thermal expansion (CTE) of fused silica ensures that the deformation of the support plate is kept to a small amount, so changes in the cavity length as a function of temperature are small.

WO 2017/189060 A1 and a corresponding journal publication: T. D. Shoji et al., "Ultra-low-noise monolithic mode-locked solid-state laser", Optica, Vol. 3, Issue 9, pp. 995-998 (2016) disclose a monolithic mode-locked laser design with a saturable absorber in which the cavity is formed by a block of CaF2 crystal on which all the optical components are directly attached with different bonding technologies. The intra-cavity laser beam propagates inside the CaF2 block. With this monolithic approach, it is said that the solid-state laser is robust and insensitive to changes in ambient temperature. Despite its robust nature, the relatively high CTE of CaF2 of $\alpha \neq 19 \times 10-6$ K-1 means that the cavity length changes significantly as the temperature changes, so this laser has to be temperature stabilized with high accuracy.

SUMMARY OF THE INVENTION

According to one aspect of the invention there is provided a solid-state laser resonator comprising:
a substrate;
a gain medium element made of a gain material;
at least a first mirror or lens optical component that forms at least a part of a resonator cavity of the laser resonator;
at least a first optical component mount arranged to fixedly mount its respective optical component on the substrate by bonds between the or each optical component mount and the or each optical component and further bonds between the or each optical component mount and the substrate;

a gain medium mount arranged to fixedly mount the gain medium element on the substrate by a bond between the gain medium mount and the gain medium element and a further bond between the gain medium mount and the substrate, wherein the substrate, the optical components and the optical component mounts are made of respective materials with coefficients of thermal expansion that are less than $3.5 \times 10^{-6}$ K$^{-1}$ and that differ from one another by less than $3.5 \times 10^{-6}$ K$^{-1}$, in both cases at a temperature of 20° C.

The optical components and the optical component mounts may, for example, be made of a crystal, a glass, a ceramic or a glass-ceramic material. By the term solid-state laser resonator, we include not only solid-state lasers, but also optical parametric oscillators (OPOs), which like solid-state lasers are also formed by a laser resonator, but the gain medium element is a non-linear crystal.

The optical components may be focusing elements, such as curved mirrors or lenses, or planar elements, such as planar mirrors. In particular, the optical components may include one or more of: a focusing mirror or lens for focusing a pump beam on the gain medium element; one or more focusing mirrors or lenses for focusing a cavity mode of the resonator onto the gain medium element; one or more fold mirrors for the resonator cavity; one or more focusing mirrors or lenses for focusing a cavity mode of the resonator onto a back reflector of the cavity; one or more mirrors or lenses for directing a cavity mode of the resonator onto the output coupler (which may be focusing or non-focusing); and an output coupler for the resonator cavity.

In some designs there may be first and second mirror or lens optical components forming at least a part of a resonator cavity of the laser resonator; and first and second optical component mounts arranged to fixedly mount the first and second optical components on the substrate by bonds between each optical component mount and each optical component and further bonds between each optical component mount and the substrate. In some further designs there may be first, second and third mirror or lens optical components forming at least a part of a resonator cavity of the laser resonator; and first, second and third optical component mounts arranged to fixedly mount the first, second and third optical components on the substrate by bonds between each optical component mount and each optical component and further bonds between each optical component mount and the substrate. In some still further designs there may be 4, 5, 6 or more pairs of optical components and mounts as required.

The gain medium element is made of a gain material such as a crystal, a glass, ceramic or a glass-ceramic material. The gain medium element may be in the form or a cylindrically shaped block (i.e. a rod) or a block of square, rectangular or hexagonal cross-section. The gain medium element may also be a section of optical fibre arranged in an external resonator cavity, e.g. a section of silica optical fibre or a phosphate glass optical fibre, doped with one or more rare-earth elements such as erbium, ytterbium etc, where we define rare earth elements to be the fifteen lanthanides (57-71 in periodic table), as well as scandium and yttrium. The gain medium element may also be a waveguide, such as a solid-state waveguide arranged in a free-space resonator cavity. Two specific examples of these are: Er:Yb:Ce co-doped ZBLAN glass waveguides formed by laser inscription; and planar waveguides made from Er:Yb co-doped phosphate glass.

The gain medium mount may be specially designed to accommodate its heating in use. Specifically, the gain medium mount may comprise first and second parts that are fixedly mounted to each other, the first part being made of an iron-nickel metal alloy (e.g. Invar and related alloys) with a CTE at 20° C. of less than $\alpha = 5 \times 10^{-6}$ K$^{-1}$ and including the further bond to the substrate and the second part being made of a material with a thermal conductivity greater than 50 W m$^{-1}$ K$^{-1}$ at 20° C. and including the bond to the gain medium element. The gain medium mount may further comprise at least one screw with a male thread, wherein the second part has a through-hole dimensioned to accept the screw and the first part has a female thread matched to the male thread of the screw, the first and second parts being fixedly fastened to each other by the at least one screw. Alternatively, the first and second parts could be fixedly mounted to each other with an adhesive bond, such as using a self-curable adhesive. The second part may additionally include a through-hole that provides a beam path to and from the gain medium element.

In certain embodiments, the coefficients of thermal expansion of the substrate, the optical components and the optical component mounts are all less than one of: 3.0, 2.0, 1.0, 0.5 and $0.1 \times 10^{-6}$ K$^{-1}$ and differ from one another by less than 3.0, 2.0, 1.0, 0.5 and $0.1 \times 10^{-6}$ K$^{-1}$, in both cases at a temperature of 20° C.

The substrate may be made of fused silica. The optical components may also be made of fused silica. The optical component mounts may also be made of fused silica. The substrate, the optical components and the optical component mounts may all be made of a common material, i.e. the same material, which may be fused silica.

The laser resonator may further comprise a saturable absorber element and a saturable absorber mount, the saturable absorber mount being arranged to fixedly mount the saturable absorber element on the substrate by a bond between the saturable absorber mount and the saturable absorber element and a further bond between the saturable absorber mount and the substrate. The optical components may further include a focusing mirror or lens optical component for the saturable absorber element together with an associated optical component mount, the focusing optical component being arranged to form a focus on the saturable absorber element, the associated optical component mount being arranged to fixedly mount the focusing optical component on the substrate by a bond between its associated optical component mount and the focusing optical component and a further bond between the focusing optical component mount and the substrate. The saturable absorber element may for example be a semiconductor saturable absorber mirror, SESAM. A SESAM combines a saturable absorbing medium and a Bragg reflector. In a conventional, i.e. non-ring, resonator design the Bragg reflector may form the cavity end mirror or back reflector. In some embodiments the saturable absorber mount comprises first and second parts that are fixedly mounted to each other, the first part being made of an iron-nickel metal alloy (e.g. Invar and related alloys) with a CTE of less than $\alpha = 5 \times 10^{-6}$ K$^{-1}$ at 20° C. and including the further bond to the substrate and the second part being made of a material with a thermal conductivity greater than 50 W m$^{-1}$ K$^{-1}$ at 20° C. and including the bond to the saturable absorber element. The saturable absorber mount may further comprise at least one screw with a male thread, wherein the second part has a through-hole dimensioned to accept the screw and the first part has a female thread matched to the male thread of the screw, the first and second parts being fixedly fastened to each other by the at least one screw.

In some embodiments, the optical components include a pump beam focusing lens or mirror optical component and an associated optical component mount, the pump beam focusing optical component being arranged to form a focus of a pump beam on the gain medium element, its optical component mount being arranged to fixedly mount the pump beam focusing optical component on the substrate by a bond between its optical component mount and the pump beam focusing optical component and a further bond between its optical component mount and the substrate. In some embodiments, the optical components include an output coupler for the resonator cavity. In some embodiments, the optical components include at least one cavity fold mirror and respective further optical component mounts, each further optical component mount being arranged to fixedly mount a cavity fold mirror on the substrate by a bond between the further optical component mount and the cavity fold mirror and a further bond between the further optical component mount and the substrate. In certain embodiments, the gain medium mount comprises first and second parts that are fixedly mounted to each other, the first part being made of an iron-nickel metal alloy with a CTE of less than $\alpha=5\times10-6$ K−1 at 20° C. and including the further bond to the substrate and the second part being made of a material with a thermal conductivity greater than 50 W m−1 K−1 at 20° C. and including the bond to the gain medium element. The gain medium mount may further comprise at least one screw with a male thread, wherein the second part has a through-hole dimensioned to accept the screw and the first part has a female thread matched to the male thread of the screw, the first and second parts being fixedly fastened to each other by the at least one screw. The second part may if needed include a through-hole that provides a beam path to and from the gain medium element.

In certain embodiments, the bonds between the optical component mounts and the optical components and the further bonds between the optical component mounts and the substrate are formed with a light-curable adhesive material. In certain embodiments, the bond between the gain medium mount and the gain medium element and the further bond between the gain medium mount and the substrate are formed with an adhesive material, e.g. a self-curable adhesive, such as a two-component epoxy resin, or a light-curable adhesive material. In certain embodiments, the bond between the saturable absorber mount and the saturable absorber and the further bond between the saturable absorber mount and the substrate are formed with an adhesive material, e.g. a self-curable adhesive, such as a two-component epoxy resin, or a light-curable adhesive material.

A further aspect of the disclosure relates to a method of assembling a solid-state laser resonator. For assembly, at least the following components are supplied: a substrate; a gain medium element made of a gain material; at least a first optical component being a lens or mirror for forming at least a part of a resonator cavity of the laser resonator; one or more optical component mounts for fixedly mounting respective ones of the optical components on the substrate by bonds between the or each mount and the or each optical component and further bonds between the or each mount and the substrate; and a gain medium mount for fixedly mounting the gain medium element on the substrate by a bond between the gain medium mount and the gain medium element and a further bond between the gain medium mount and the substrate. The substrate, the optical components and the optical component mounts are made of respective materials with coefficients of thermal expansion that are less than 3.5×10−6 K−1 and differ from one another by less than 3.5×10−6 K−1, in both cases at a temperature of 20° C. Assembly of the components into a solid-state laser resonator proceeds by: aligning a first one of the optical components; placing an optical component mount for the first optical component with one surface thereof in contact with a surface of the substrate and another surface thereof in contact with a surface of the first optical component; applying a bonding agent to the contact surfaces; and curing the bonding agent to bond the contact surfaces so that the optical component is fixedly mounted to the substrate via its optical component mount. These four steps are then also applied to each further optical component that has been supplied. Assembly of the gain medium element proceeds by: aligning the gain medium element; placing the gain medium mount with one surface thereof in contact with a surface of the substrate and another surface thereof in contact with a surface of the gain medium element; applying a bonding agent to the contact surfaces; and curing the bonding agent to bond the contact surfaces so that the gain medium element is fixedly mounted to the substrate via the gain medium. The gain medium mount referred to in the assembly method above may be two-part as described further above in relation to the laser resonator. It will be understood that the order of the assembly steps can be chosen as desired and the order in which these steps are recited above does not imply a limitation to the particular order in which they must be performed during assembly. In particular, the mounts could be bonded to the substrate before the optical elements are bonded to the mounts or vice versa. Moreover, the optical components might be bonded before or after the gain medium (not necessarily before). Moreover, groups of components could be aligned together before any are bonded, and then the bonding done later.

The bonds between the optical component mounts and the optical components and the further bonds between the optical component mounts and the substrate may be formed with a light-curable adhesive material, said curing comprising exposure of the adhesive with light.

Prior to curing, at least one of the optical components may be positioned for bonding with the aid of a light beam which propagates along a lasing beam path of the resonator cavity.

A saturable absorber element and a saturable absorber mount may additionally be supplied. The mount is for connecting the saturable absorber element to the substrate by a bond between the saturable absorber mount and the saturable absorber element and a further bond between the saturable absorber mount and the substrate. The assembly of the saturable absorber is performed by: aligning the saturable absorber; placing the saturable absorber mount with one surface thereof in contact with a surface of the substrate and another surface thereof in contact with a surface of the saturable absorber; applying a bonding agent to the contact surfaces; and curing the bonding agent to bond the contact surfaces so that the saturable absorber is fixedly mounted to the substrate via the saturable absorber mount. The saturable absorber mount could be made of two parts as described above for the gain media mount. For the saturable absorber fixation, the order of the assembly steps can also be varied as appropriate and is not limited to the order in which these steps are stated above.

BRIEF DESCRIPTION OF THE DRAWINGS

This invention will now be further described, by way of example only, with reference to the accompanying drawings.

DETAILED DESCRIPTION

Figure 1:
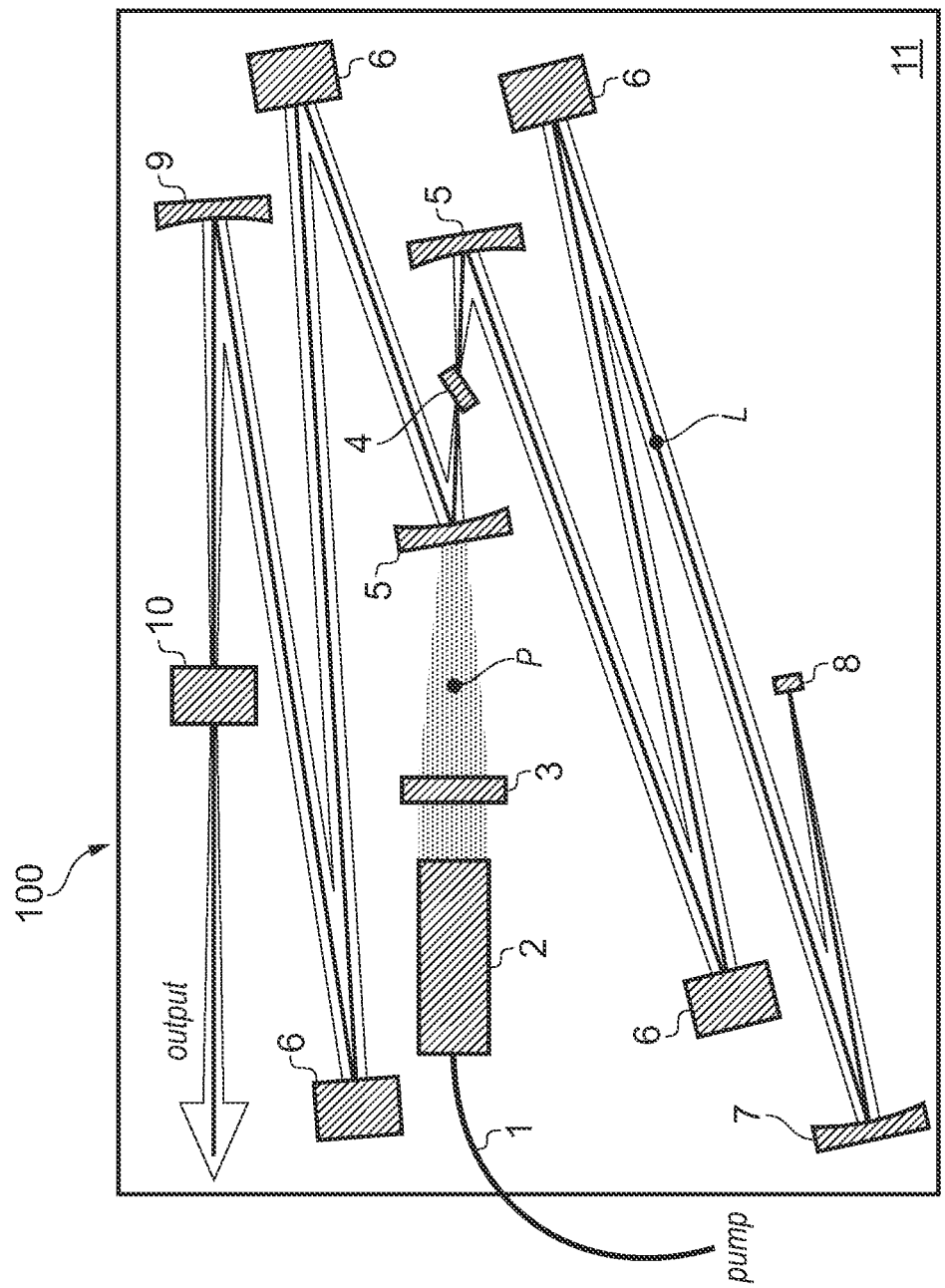
FIG. 1 is a schematic view of the optical design of a laser according to an embodiment of the disclosure.

In the following detailed description, for purposes of explanation and not limitation, specific details are set forth in order to provide a better understanding of the present disclosure. It will be apparent to one skilled in the art that the present disclosure may be practiced in other embodiments that depart from these specific details.

Embodiments of the disclosure relate to ultrafast solid-state lasers.

Certain materials and terms referred to in this document are defined and specified as follows:

Monolithic laser: Can mean a laser in which the whole resonator consists of one piece of solid-state material, but sometimes also has a broader definition for any laser with no air gaps in the laser beam path. The monolithically realised cavity components in a monolithic laser will at least include the cavity defining mirror elements and, in most designs, also additional components, such as cavity fold mirrors, and other mirrors or lenses for focusing or collimating.

Quasi-monolithic laser: A laser resonator constructed such that its components including the solid-state gain medium and cavity components are fixedly connected to each other, e.g. by all being fixed to a common support plate, or to another shared structure, such as a frame. The cavity components in a laser of quasi-monolithic construction are as mentioned for a monolithic laser.

Fused silica glass (synonym fused quartz) is a glass made of silicon dioxide as the main glass-forming constituent. Silica glass has a low CTE of $\alpha=0.55\times10^{-6}$ K$^{-1}$ between 20° C. to 320° C. and a low thermal conductivity at 20-100° C. of approximately 1.4 to 1.5 W m$^{-1}$ K$^{-1}$. By silica glass we include not only relatively pure material consisting essentially only of silicon and oxygen, but also silica glass that contains some level of additives or impurities such as chlorine, hydrogen, aluminium, titanium, boron, and phosphor. For the non-optical components such as the substrate and the mount pieces (assuming light it not transmitted through the mount piece), only the thermal and mechanical properties of the fused silica are of interest. For such non-optical components, a fused silica such as GE 124 may be used. GE 124 is an example of a so-called non-optical fused silica which is typically not of high enough optical quality to user for optical components. Nevertheless, the purity of this type of fused silica is still 99.995% or better. The typical chemical trace element composition of GE 124 in ppm by weight is: Li 0.6, B<0.2, Na 0.7, Mg 0.1, Al 14, P<0.2, K 0.6, Ca 0.4, Ti 1.1, Cr<0.05, Mn<0.05, Fe 0.2, Ni 0.7, Cu 0.05, As<0.002, Cd<0.01, Zr 0.8, Sb<0.003, OH 5. Other sub-optical quality fused silica glass that could be used as alternatives to GE 214 are HSQ 100 and HSQ 300.

Borosilicate glass is a type of glass with silica and boron trioxide as the main glass-forming constituents. Some borosilicate glasses have relatively low CTEs of $\alpha\approx3\times10^{-6}$ K$^{-1}$ at 20° C. and relatively low thermal conductivity of 1.2 W m$^{-1}$ K$^{-1}$ at 20° C., such as Pyrex (Corning trade mark—SiO2-B2O3-Na2O-Al2O3) or DURAN (Schott trade mark). Other borosilicate glasses, such as BK7 or N-BK7 (Schott trade marks) have significantly larger thermal expansion coefficients, i.e. $\alpha\approx7.1\times10^{-6}$ K$^{-1}$ at 20° C.

Ultra-low expansion glass (ULE) is a registered trade mark of Corning Incorporated and has silica and less than 10% titanium dioxide as its main glass-forming constituents. ULE has a very low CTE of $\alpha\approx0.01\times10^{-6}$ K$^{-1}$ at 5-35° C. and a low thermal conductivity at 20° C. of 1.3 W m$^{-1}$ K$^{-1}$.

Invar is a nickel-iron alloy with a composition consisting of 64% iron and 36% nickel, also known as FeNi36 (referred to as 64FeNi in the United States) which, for a metal, has an extremely low CTE. Common grades of Invar have a CTE between 20° C. and 100° C. of about $\alpha=1.2\times10^{-6}$ K$^{-1}$, which is comparable to low thermal expansivity glasses, and a thermal conductivity at 20° C. of approximately 13 W m$^{-1}$ K$^{-1}$, which is quite low for a metal, but an order of magnitude higher than for most glasses. By Invar we include variations from FeNi36 with low CTEs including Inovco and FeNiCo alloys such as Kovar or Dilver P. Inovco is Fe-33Ni-4.5Co and has a CTE $\alpha=0.55\times10^{-6}$ K$^{-1}$ from 20-100° C. FeNi42 (for example NILO alloy 42) has a nickel content of 42% and a CTE $\alpha\approx5.3\times10^{-6}$ K$^{-1}$. FeNiCo alloys such as Kovar or Dilver P have the same expansion behaviour as borosilicate glass and therefore are particularly attractive in embodiments of the present disclosure for use in combination with a substrate made of borosilicate glass (instead of fused silica glass).

CaF2 is a crystal material used for optical components. It has a CTE $\alpha\approx18-19\times10^{-6}$ K$^{-1}$ at 20-100° C. and a thermal conductivity at room temperature of 9.7 W m$^{-1}$ K$^{-1}$.

Sapphire is one of the crystal forms of Al2O3 and is used for optical components. It has a CTE $\alpha=6$ to $7\times10^{-6}$ K$^{-1}$ at 20-100° C. and a thermal conductivity at 20-100° C. of approximately 15 to 30 W m$^{-1}$ K$^{-1}$.

Silicon Carbide (SiC) exists both as a semiconductor crystal and a ceramic. In crystal form it is sometimes used for mirrors. SiC combines a high thermal conductivity with relatively low thermal expansion in relation to its thermal conductivity. Ceramic SiC is available with thermal expansion coefficients of approximately $\alpha=3.5\times10^{-6}$ K$^{-1}$ and a thermal conductivity of 120 W m$^{-1}$ K$^{-1}$ (over the temperature range 20° C. to 100° C.).

Clearceram (Ohara trade mark) is a glass-ceramic material commercially available from Ohara Corporation, which is sold in two grades. For the "CCZ regular" grade of Clearceram, the thermal expansion coefficient is $\alpha=0.02\times10^{-6}$ K$^{-1}$ at $-60$-$160$° C. and the thermal conductivity is 1.5 W m$^{-1}$ K$^{-1}$. For the "CCZ HS" grade of Clearceram, the thermal expansion coefficient is $\alpha=-0.02\times10^{-6}$ K$^{-1}$ at $-60$-$160$° C. and the thermal conductivity is 1.5 W m$^{-1}$ K$^{-1}$.

Zerodur (Schott trade mark) is a glass-ceramic material. Its forming constituents include SiO2-Al2O3-P2O5. Its thermal expansion coefficient is $\alpha=0\pm0.02\times10^{-6}$ K$^{-1}$ (for 0° C. to 50° C. and expansion class 0) and its thermal conductivity is 1.46 W m$^{-1}$ K$^{-1}$.

Aluminium is a metal with a CTE $\alpha=23.1\times10^{-6}$ K$^{-1}$ at 20° C. and a thermal conductivity at 0-100° C. of approximately 240 W m$^{-1}$ K$^{-1}$.

Copper is a metal with a CTE $\alpha=17\times10^{-6}$ K$^{-1}$ at 20° C. and a thermal conductivity at 0-100° C. of approximately 400 W m$^{-1}$ K$^{-1}$.

Stainless Steel is a steel alloy with a CTE $\alpha=10\times10^{-6}$ to $17\times10^{-6}$ K$^{-1}$ at 20° C. and a thermal conductivity at 20° C. of approximately 10 W m$^{-1}$ K$^{-1}$ to 30 W m$^{-1}$ K$^{-1}$.

Light-curable adhesives are adhesives that are cured by exposure to light of specified wavelengths and intensities. The curing wavelength of commercially available light-curable adhesives is in the visible or UV range, typically 350 to 500 nm. The curing light initiates a photochemical reaction in the adhesive that generates a crosslinked network of polymers. The most common chemistries are acrylic and urethane. The adhesive formulation consists of monomers and oligomers, various agents and modifiers (e.g. wetting agents, stabilisers, fillers) in combination with a photo-initiator. These elements coexist in the formulation without reacting with each other until exposed to the curing light. When the photo-initiator is exposed to the curing light, free radicals are formed, initiating a polymerization reaction. The curing with light exposure may not ensure immediate complete curing, even though it may be sufficient to fix the position of the elements being bonded. It may be necessary to wait some time in ambient conditions, e.g. several days or perhaps a week or two, to allow full curing. Another option is to perform a secondary cure by baking, e.g. by heating to an elevated temperature of approximately 100 or 110° C.

Optical Equivalence of Mirrors and Lenses: It will be appreciated that for all reflecting and focusing activity in optics, mirror and lens elements are freely substitutable, so that while certain elements in specific embodiments described herein are realised with mirrors in principle each mirror will have a lens equivalent. For example, a cylindrical lens and planar mirror could be substituted for a cylindrical mirror to achieve the equivalent optical result. The converse is also true, so that while certain elements in specific embodiments described herein are realised with lenses in principle each lens will have a mirror equivalent. Moreover, a combination of planar mirror and convex or concave lens may be equivalent to a convex or concave curved mirror without a lens, or a curved mirror and a lens.

Optical Design

FIG. 1 is a schematic view of the optical design of a laser 100 according to embodiment of the disclosure. The beam path of the principle cavity mode that lases is shown schematically as well as the beam path of the pump and of the output beam. Other embodiments may have different cavity designs and may have fewer or more components. The components shown in FIG. 1 are now explained.

Pump delivery fibre 1: Pump light P is delivered from a pump laser (not shown) to the laser 100 via a polarization-maintaining (PM) single-mode fibre from a fibre-coupled wavelength-stabilized pump diode laser. In the case of an Er:Yb:glass gain medium, the wavelength of the pump light is locked at 976 nm. In alternatives, the pump diode laser could be unstabilized and the delivery fibre could be non-polarization maintaining or multimode. Moreover, a free-space delivery of the pump beam from the pump diode laser into the laser 100 could be used. The pump diode can be single- or multi-emitter. Moreover, the pump laser could be integrated with the laser of FIG. 1 by mounting on the same substrate 11.

Pump light collimator 2: The pump light P is collimated with a fibre collimator. Instead of using a pre-assembled commercially available fibre collimator, the collimator could be made from discrete optical components, e.g. by cleaving the fibre to produce an end-facet and collimating the light with a lens. Additionally, free-space pump delivery without a fibre collimator would also be possible.

Focusing lens 3: The pump light is focussed into the gain media with a standard spherical plano-convex lens. In alternatives, other types of lenses could be used. Moreover, different types of pump optics could be used. Furthermore, the gain medium does not necessarily have to be located in the focus of the pump light.

Gain medium element 4: The gain medium element is typically aligned at its Brewster angle relative to the pump and laser light incident on it. The gain medium element typically has a simple cuboid shape, but could be rod-shaped, i.e. circular in cross-section. Two opposite faces are polished, but uncoated, for the laser transmission. The laser medium could be an erbium-ytterbium co-doped glass, such as a phosphate glass, but also any other solid-state gain media could be used, such as another glass, a crystal, a ceramic or a glass-ceramic. The gain medium element could also be installed under a different angle, it could be coated with anti-reflection coatings, and/or could be wedge shaped in order two supress etalon effects. The gain medium may also be bonded to, or formed integrally with, a mirror, such as a fold mirror or cavity end mirror, such as the output coupler or back reflector. For example, a mirror coating may be deposited on a polished surface of the gain medium, so that the latter forms the substrate for the former.

Concave mirrors 5: To focus the desired resonator cavity mode onto the gain medium element a pair of concave mirrors is arranged with the gain medium element situated between them. The concave mirrors have a high-reflective coating at the lasing wavelength and an anti-reflection coating for the pump-light on the concave surface. The back surface of the concave mirrors, which is typically flat, has an anti-reflection coating for both the laser light and the pump light. The group delay dispersion (GDD) for the laser light is typically made as small as possible. The anti-reflection coatings are not absolutely necessary, but are useful to achieve good laser performance. GDD (group delay dispersion) could be added to these mirrors in case of soliton mode-locking.

Fold mirrors 6: One or more mirrors are used to fold the cavity. The fold mirrors are flat, i.e. planar, in our current designs. In case of a soliton mode-locked laser, some of these mirrors might be dispersive to provide negative GDD. The fold mirrors are not necessary for laser performance and could be omitted altogether; they are just provided to fold the cavity and hence make a more compact laser. It will be understood that the number of folds may be selected as desired to provide an overall package length to meet a particular specification. The minimum number of folds is one. One or more of the fold mirrors may be curved (concave or convex) in alternative designs. (Other cavity designs may omit fold mirrors altogether.)

Concave mirror 7: A concave high-reflective mirror is used to produce a focus on the SESAM, in order to reach a sufficiently high pulse fluence to saturate the absorber.

Saturable absorber 8: A SESAM is used for the pulse formation in the mode-locked laser. Alternatively, different saturable absorbers could be used as well, e.g. absorbers based on carbon nanotubes or other fullerenes. It will be understood that the Bragg reflector part of the SESAM constitutes the laser cavity's back (or end) reflector, which together with the output coupler 10 bounds the laser resonator cavity and, with the other cavity components 4, 5, 6, 7 and 9, defines a beam path L for laser light in the cavity.

Concave mirror 9: A concave mirror is used to produce a focus on the output coupler 10. In some designs, this focus is not needed, so such a concave mirror can be omitted, namely when the output coupler 10 is not located at a focus, but rather in a collimated part of the beam.

Output coupler 10: An output coupler is a partially reflective mirror for coupling out a fraction of the laser light from inside the laser resonator to outside as output. The backside of the mirror, i.e. the side facing away from the cavity, preferably has an antireflection coating for the laser light, and the output coupler is preferably slightly wedged to avoid etalon effects and light reflected from the backside of the output coupler back into the laser cavity.

Substrate 11: The components 2-10 are fixed, i.e. mounted in a non-adjustable way, to a planar substrate or support plate 11; either directly or via optic mounts as described in detail further below.

Figure 1A:
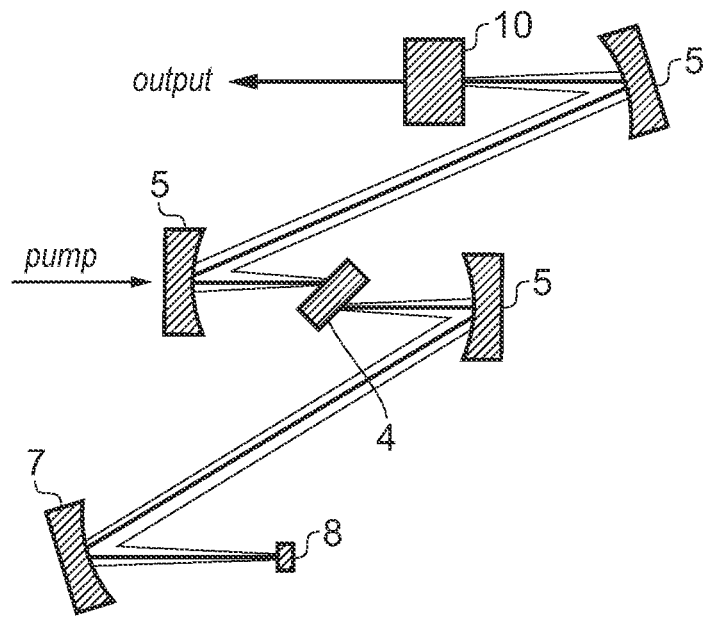
FIGS. 1A to 1E show various other example optical designs according to further embodiments of the disclosure.
Figure 1B:
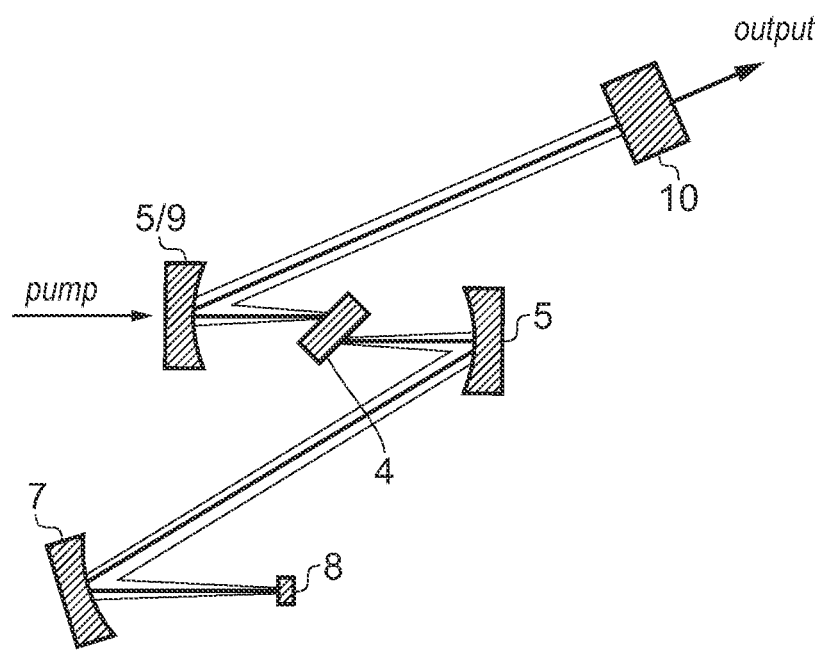
Figure 1C:
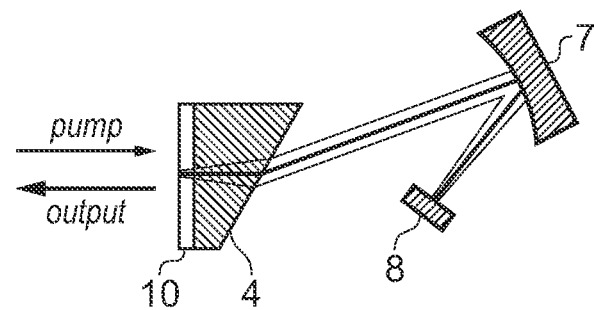
Figure 1D:
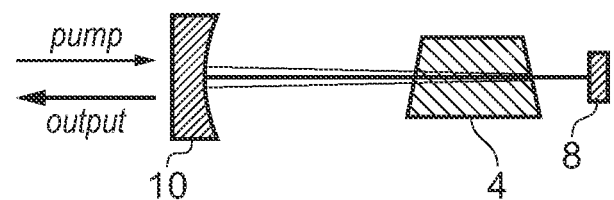
Figure 1E:
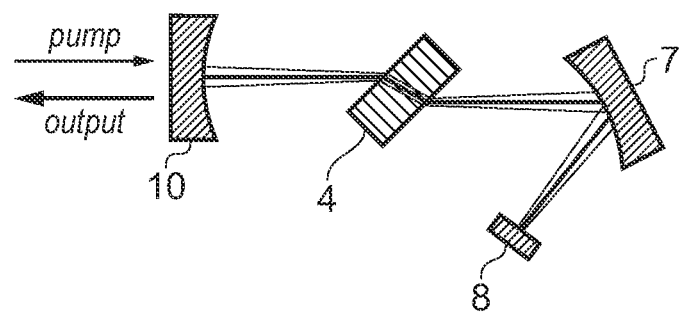

FIGS. 1A to 1E show various other example optical designs according to further embodiments of the disclosure. The reference numerals are consistent with those used in FIG. 1. FIG. 1A shows an optical design which is equivalent optically to the design of FIG. 1, but in which fold mirrors 6 are omitted. FIG. 1B shows an optical design with a further reduction in complexity in that there is no focusing on the output coupler 10, so the concave mirror 9 of FIG. 1 is absent. FIGS. 1C, 1D & 1E show optical designs that are able to provide particularly compact designs. It will be appreciated that FIG. 1 and FIGS. 1A to 1E show the optical design of different laser cavities, there may well be further optical components such as filters, pump-guiding lenses and so forth, which also need to be fixed to the substrate. Reducing the overall number of optical components may be beneficial as repetition rates are increased (e.g. >2.5 GHz). Such a reduction may be achieved, for example, by combining some of the components into a single component (e.g. the gain medium element may be combined with the output coupler by forming the output coupler as a coating on a surface of the gain medium element as shown in FIG. 1C).

Some further variations, options and details of the design are now mentioned.

The SESAM 8 or other cavity elements can be fixed on a piezo actuator for repetition rate tuning.

The laser output can be coupled into an optical fibre.

In case of soliton mode-locking, additional optical elements can be arranged inside laser cavity to produce a sufficient amount of self-phase modulation (SPM). A suitable optical element is a plate used in transmission and made of a material with a suitably nonlinear refractive index.

An element for second harmonic generation (SHG) or other nonlinear optical conversion can be added to the laser. Typically, this is done outside of the laser cavity, but it is also possible to be done inside the laser cavity.

Different mode-locking techniques are possible. Passive mode-locking may be used, e.g. SESAM mode-locking, soliton mode-locking, or Kerr lens mode-locking. Alternatively, active mode-locking may be used, e.g. by use of an electro-optic modulator.

Not only fundamental mode-locking (i.e. one light pulse is oscillating inside the laser cavity), but also harmonic mode-locking is possible (i.e. multiple light pulses are oscillating inside the laser cavity).

Mode-locked ring laser: The laser cavity need not be a linear resonator, but can also be a ring resonator. This is possible for many different mode-locking techniques, e.g. SESAM mode-locking, soliton mode-locking, Kerr lens mode-locking, and active mode-locking. It is possible to have a single pulse rotating in one direction of the ring cavity (e.g. by use of an optical isolator). It is also possible to have a colliding pulse scheme where two pulses counterrotate around the ring cavity.

Different pump schemes are possible. It is possible to use a free-space laser diode (i.e. non-fibre coupled pump diode) for pumping the gain medium. It is possible to pump the laser with another solid-state laser (e.g. green pump laser for titanium sapphire lasers). Multiple pump beams from multiple pump sources may be combined.

Different types of saturable absorbers can be used to mode-lock the laser, e.g. SESAMs (semiconductor saturable absorber mirrors) or saturable absorbers based on carbon nanotubes or other fullerenes.

One class of laser that can be produced according to the above-described designs is ultrafast solid-state lasers, which may have pulse durations of femtoseconds or picoseconds, typically within the range from 5 fs to 100 ps, and pulse repetition rates in the range from 20 MHz to 50 GHz.

Assembly Methods

Laser construction and assembly methods for manufacturing laser responators according to embodiments of the disclosure are now described through the example of an ultrafast solid-state laser. The design and assembly is based on applying two principles.

According to the first design principle, the substrate and as many as possible of the cavity's optical components and their mounts are made from the same material, or materials with similar thermal expansion and thermal conductivity properties. The material or materials used for the substrate and these optical components preferably have a low absolute value of their CTEs as well as the same or closely matched CTEs. In this way, the absolute magnitude of thermal expansion and contraction of these components, their mounts and the substrate, as well as the magnitude of the differential thermal expansion and contraction between these components and their mounts and between the mounts and the substrate, are both limited to small amounts, or completely avoided in the case of using the same materials for an optical component and its mount, or a mount and the substrate, or for all of these optical components, their mounts and the substrate.

According to the second design principle, as many as possible of the optical components and their mounts are fixedly connected to each other and to the substrate by bonding adjacent, touching surface portions of any two components, where the bonding takes place preferably between two flat and smooth surfaces. The bonding may be adhesive bonding, such as with a light-curable adhesive, a thermally activated adhesive or a self-curing adhesive, or with some other form of bonding such as molecular bonding, chemically activated direct bonding or hydroxide catalysis bonding such as described in U.S. Pat. No. 6,284,085 B1, for example. By fixing two components made from the same material to each other via planar surfaces with adhesive bonding, thermal expansion is not problematic for the interface, because the components expand and contract by the same amount and thus mechanical stress can be kept to a minimum. However, since the choice of gain medium will be dictated by the laser design, e.g. Er:Yb co-doped phosphate glass, the first design principle cannot generally be applied to the gain medium. However, the second design principle of using adhesive bonding (and so not using screw fasteners, for example) can be applied to mounting the gain medium on the substrate. If the laser also includes a saturable absorber, the materials choice here is also dictated by the laser design, so the first design principle cannot generally be applied to the choice of saturable absorber either. The gain medium and also to a lesser extent the saturable absorber may also require the provision of heat sinks for cooling, so it may be necessary to make their mounts out of a good thermal conductor, such as copper, aluminium or another metal that is a good thermal conductor, or out of a crystal, such as CaF2, that is a relatively good thermal conductor. Making the gain medium mount and optionally also the saturable absorber mount out of a material that is a sufficiently good thermal conductor for heat sinking purposes restricts the choice of material considerably if the material should also possess a CTE that matches, or is at least not to dissimilar from, that of the substrate. In some designs, close matching of the thermal expansion coefficient may be sacrificed, whereas in other designs a material such as silicon carbide ceramic may be chosen that may provide a reasonable match. Silicon carbide ceramic may be a particularly attractive choice for the saturable absorber mount. Another approach for mounting a gain medium element or a saturable absorber is to design a multi-part mount, as described further below. There may also be other components where the material is dictated by the function, such as optical isolators, where similar considerations apply as to those discussed for the gain medium and saturable absorber. Moreover, some optical components may only be commercially available with high CTE parts, even though this may not be absolutely technically necessary, in which case a choice would need to be made whether to use the commercially available component or to custom manufacture an equivalent component using a low CTE material. For example, some optical fibre collimators are encased in a high-CTE metal tube and others use high-CTE glass.

By applying the above two design principles, it may be possible to construct a laser that does not require temperature control at all, or one that can operate satisfactorily with simple temperature control. It may thus be possible to make a laser system that is simpler, smaller, more energy efficient, less expensive and more reliable than would otherwise be possible. Temperature stabilization may be completely dispensed with or simplified, or merely provided locally to the gain medium and/or saturable absorber. Moreover, passive cooling elements such as heat sinks may be sufficient to keep all parts of the laser within a specified operating temperature range in which no temperature control would be needed.

By a good thermal conductor, we distinguish between metals and an optically transparent materials such as glasses, crystals or ceramics. We define a metal as a good thermal conductor when it has a thermal conductivity greater than 100 W m−1 K−1 at a temperature of 20° C. and optically transparent material to be a good thermal conductor when it has a thermal conductivity greater than 8 W m−1 K−1 at a temperature of 20° C.

By the same material, or very similar materials, we mean materials, such as glass, crystal, ceramic or glass-ceramic, that have the same or closely matched CTEs at the intended operating temperature or operating temperature range. For example, "similar" can be defined in this context by a maximum allowed difference in CTEs between any two materials at 20° C. (or any other relevant temperature).

In certain examples, the maximum allowed CTE difference, Aa, between a material and the substrate that is permitted is 3.5×10−6 K−1 at 20° C. In addition, the magnitude of the CTE is important, since it is beneficial to use materials that will not expand and contract much in an absolute sense. In one example, the substrate and the relevant optical (e.g. lenses, mirrors etc, but not the gain medium or SESAM) and non-optical component materials (e.g. the mounts) have a CTE of α<3.5×10−6 K−1 at a temperature of 20° C. Within these constraints of a and Aa both being less than 3.5×10−6 K−1, the materials options include fused silica, Pyrex, Zerodur or ULE glass. The permitted values for a and Aa may be reduced in which case the materials choice becomes more restricted. For example, if Pyrex is excluded, the CTE value a may be limited to for example less than 3.0, 2.5, 2.0, 1.5 or 1.0×10−6 K−1. Moreover, the CTE difference Aa between any component and its mount or between any mount and the substrate will of course be substantially zero if the same material is used for both. If the same materials are not used, the maximum permitted CTE difference Aa may also be lower than 3.5×10−6 K−1, for example less than 3.0, 2.5, 2.0, 1.5, 1.0, 0.8, 0.6, 0.4 or 0.2×10−6 K−1.

Despite the limitations on applying the above two design principles to the gain medium and the saturable absorber, they can be applied without restriction to lens and mirror components in the cavity. Regarding the criticality of accurate and precise alignment of different components, it is observed that, in general, alignment of non-focusing optical components that operate in transmission (e.g. filters, gain media, quarter-wave plates) is less critical than the alignment of either optical components that operate in reflection (e.g. mirrors, beam splitters) or optical components that have a focusing effect (e.g. concave or convex mirrors, lenses). However, for each optical component an analysis must be made to determine the necessary alignment accuracy. In the design of FIG. 1, the alignment is most important for the curved mirrors 5, 7 and 9 and the planar mirrors 6. It is therefore most beneficial, if the above two design principles are applied, or applied more strictly, to those components which are most sensitive to misalignment.

Regarding materials choice, fused silica is a good option in many cases. Fused silica has a very low CTE of 0.55×10−6 K−1. It is widely available commercially and relatively inexpensive, so it can be used for the substrate. A wide variety of lens and mirror components are available in fused silica, so, for example, each of the lens and mirror components 3, 5, 6, 7 and 9 of FIG. 1 can be fused silica. The mounts can also be fused silica. The mount shape may be a simple cuboid or other shapes including, for example, cuboid with a through-hole or cuboid with one or more chamfered edges, these shapes being straightforward to realise in fused silica. Other low thermal expansion materials can be used instead of, or in combination with, fused silica, namely:

Other suitable glasses with low CTEs include:
borosilicate glasses, e.g. Pyrex (Corning trade mark), Duran (Schott trade mark)
glass made of silica and <10% titanium dioxide, e.g. ULE (Corning trade mark)
Vycor made of approximately 96% silica and 4% boron trioxide (Corning trade mark)

Some ceramics with low CTEs are also suitable, for example:
- Cordierite CO720 (Kyocera trade mark)
- Adceram-CS D3 (NTK Ceratec trade mark)
- Silicon nitride
- Silicon carbide Some glass-ceramics with low CTEs that are suitable include:
- lithium-aluminosilicate glass-ceramic, e.g. Zerodur (Schott trade mark)
- Clearceram-Z glass-ceramic (Ohara trade mark)
- Astrositall—a crystalline glass-ceramic—also known as Sitall or Sitall CO-115M (trade mark of Wikimedia Foundation, Inc.)

Referring now to the second design principle, which is to use bonding, in particular adhesive bonding, as widely as possible. Glasses are in general easy to bond. Bonding of crystals will also generally be straightforward. In addition to adhesive bonding, other types of bonding that may be used include molecular bonding (synonym covalent bonding), chemically-activated direct bonding or hydroxide catalysis bonding. Among the options for adhesive bonding are adhesives that can be cured by light. With light-curable adhesives, the curing time can be very short (e.g. a few seconds). It is envisaged that light-curable adhesive bonding is used whereever possible, i.e. wherever access by the curing light is convenient, which will generally be the case so long as at least one of the two components being bonded together is transparent to the curing light.

Figure 2:
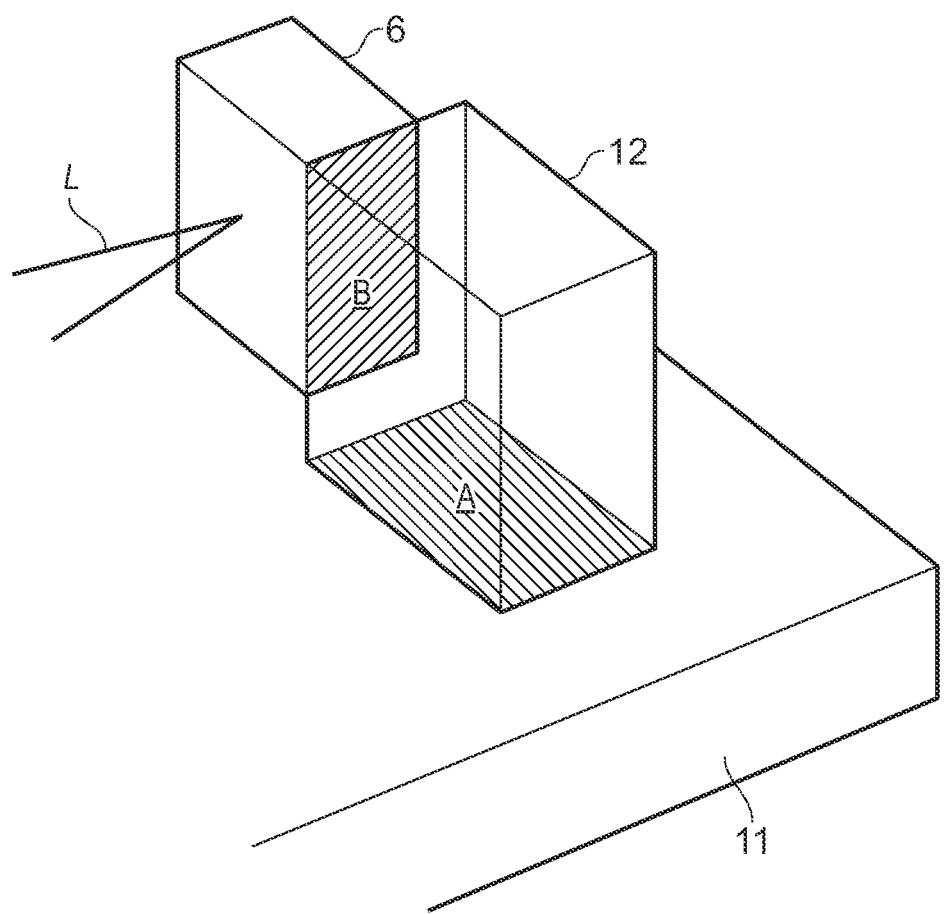
FIG. 2 is a schematic perspective view illustrating the fixation of a planar mirror to a substrate via the intermediary of a mount.

FIG. 2 is a schematic perspective view illustrating the fixation of a mirror 6 to a substrate 11 via the intermediary of a mount 12. The two overlapping bonded contact surfaces A and B are illustrated with hatching.

The alignment and bonding process of a typical optical component can be performed as follows.

The optical component 6 is releasably held in a head attached to a positioning stage (not shown) which aligns the optical component to the extent necessary having regard to the nature of the optical component. The alignment may be in up to 6 axes of freedom, i.e. three spatial directions (e.g. x, y, z in Cartesian space) and up to three rotational degrees of freedom (e.g. roll, pitch, yaw). The positioning stage will have as many axes as there are axes of freedom to define for the alignment. The component alignment can be done in absolute space with no feedback, but is more commonly done with the aid of some kind of feedback, e.g. alignment with a pilot light beam through a pinhole and/or on an optical sensor. In some cases, alignment can be done with the laser being in operation, or close to lasing, i.e. below threshold. Fluorescence from the gain medium induced by the pump beam, or light generated in an up-conversion process within the gain medium, may also be used for alignment. The pump beam, or a pilot beam supplied through the pump delivery fibre, may also be used to aid alignment. Alignment feedback may also come from measurement devices that measure the laser's performance.

When the positioning stage has completed the alignment of the optical component 6, the optical component can be fixed to the substrate 11. This is in most cases done using an optic mount piece 12 as an intermediate mechanical component. The substrate 11 is in a fixed position and the aligned optical component 6 is already aligned, where it is held in its aligned position by the translation stage's head. The optic mount piece 12 is then placed in such way that it has a first one of its surfaces brought into overlapping contact with the substrate 11 over an area A and a second one of its surfaces in overlapping contact with the aligned optical component 6 over an area B, these first and second overlapping areas of contact A and B being the surfaces to be bonded. The first and second surfaces are preferably planar surfaces and further preferably planar surfaces that are orthogonal to each other. The mount piece 12 may have a cuboid form. The mount piece 12 can then be positioned by placing it on the substrate 11 with its base surface in contact with the upper surface of the substrate 11 and then sliding the mount piece 12 into a position in which one of its side surfaces butts against the optical component. The mount piece 12 is then in contact with one of its surfaces (a side surface) with the aligned optical component 6 and with another of its surfaces (a base surface) to the substrate 11. The optical component 6, its mount piece 12 and the substrate 11 are thus now positioned ready for bonding. For adhesive bonding, the adhesive can have been applied to the relevant surfaces already prior to bringing the mount piece 12 into the bonding position. Alternatively, the adhesive can be applied afterwards, by supplying it to an edge of the mutually touching surfaces to be bonded, whereby the adhesive is drawn into the interface by capillary action and so distributes itself evenly over the bonding surfaces. In the case of a light-curable adhesive, the curing light is directed at the bonding interfaces with appropriate wavelength, intensity and duration. At least one of the components has to be transparent for this process. Alternatively, if the components are opaque or difficult to access with curing light, other bonding methods can be used (e.g. a self-curing adhesive). After curing the adhesive, the head of the translation stage is free to release the optical component. The light curing may be followed by a heat curing if desired to ensure complete curing of the adhesive. Heat curing may be deferred until all the components have been mounted and done for the laser as a whole, since the initial curing will be sufficient to fix the position and alignment of the optical component.

Figures 3A, 3B, 3C, 3D, 3E:
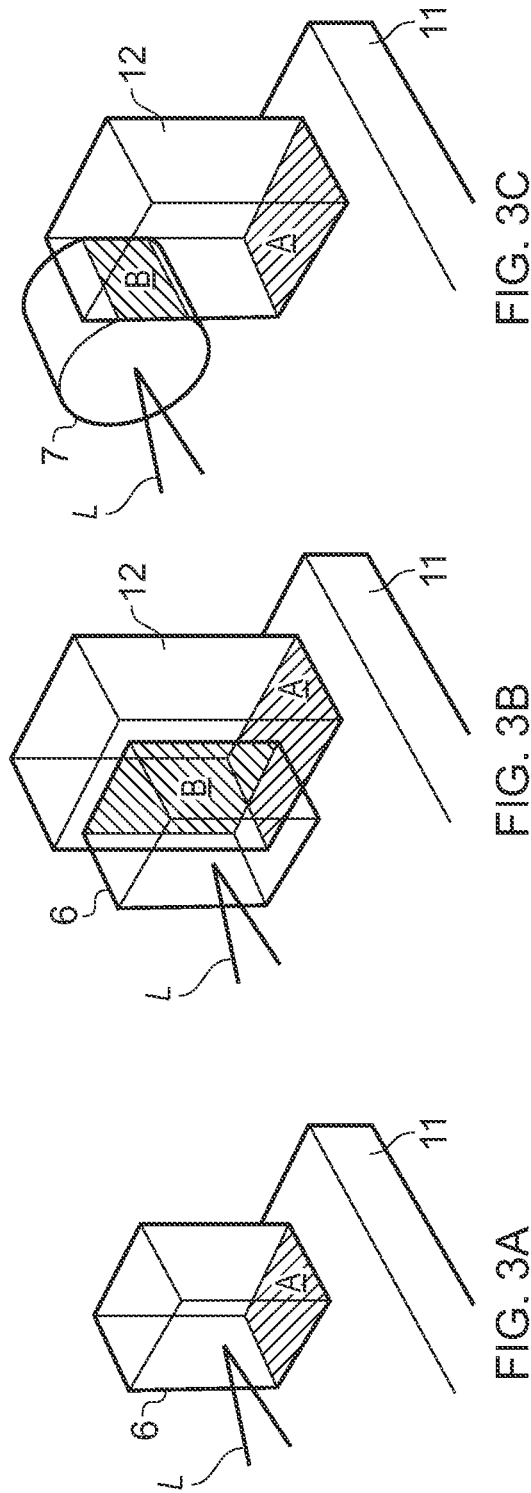
FIGS. 3A to 3K are schematic perspective views illustrating the fixation of further optical components to a substrate; directly in the case of FIG. 3A and via the intermediary of a single mount piece in the cases of FIGS. 3B to 3H and FIG. 3J and two mount pieces in the cases of FIGS. 3I and 3K.
Figure 3F:
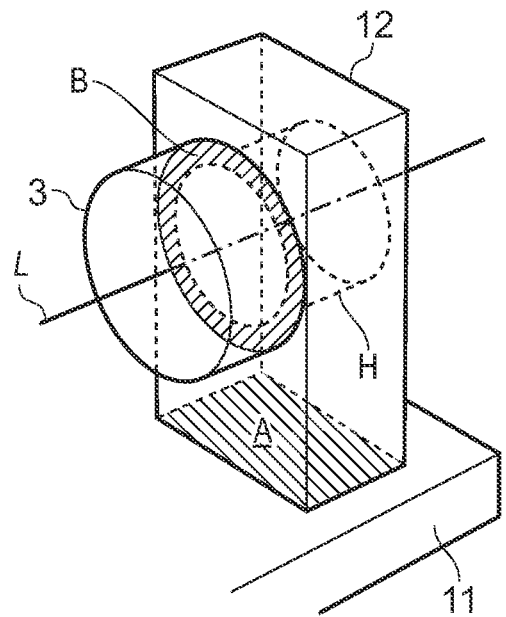
Figure 3G:
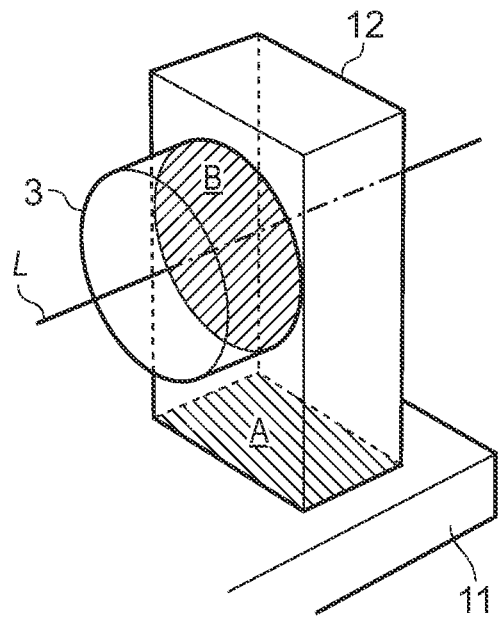
Figure 3H:
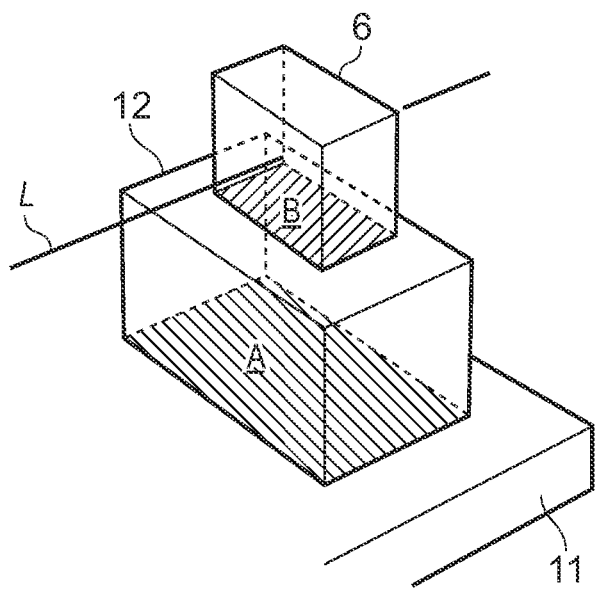
Figure 3I:
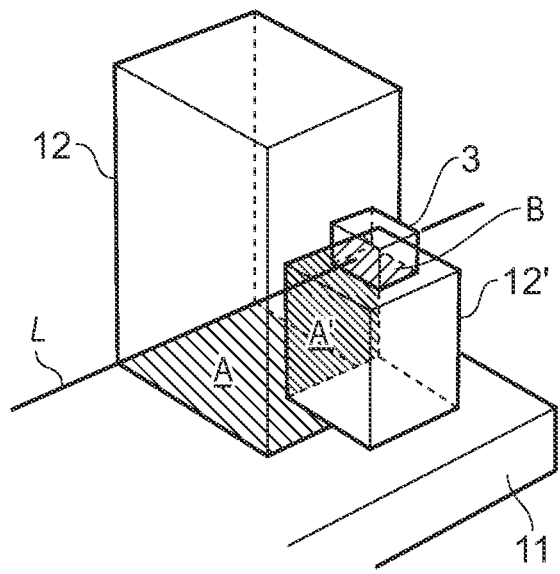
Figure 3J:
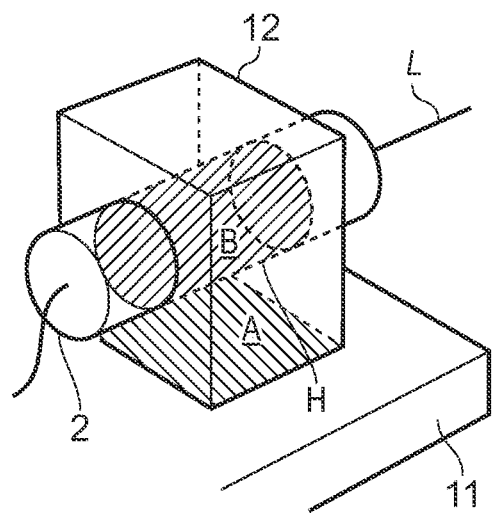
Figure 3K:
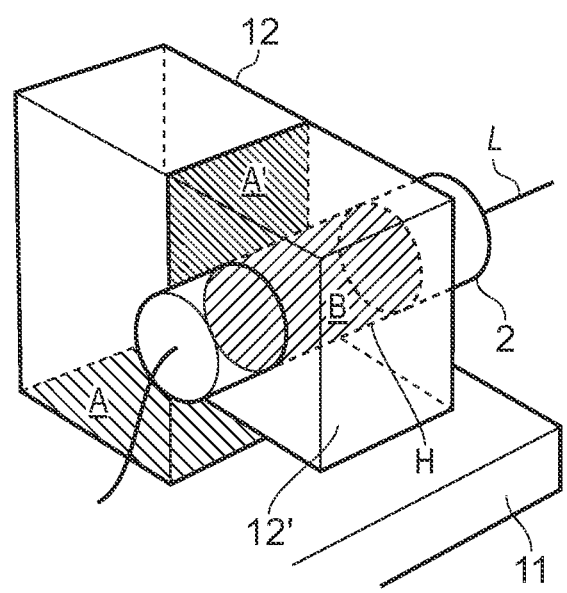

FIGS. 3A to 3K are schematic perspective views illustrating the fixation of further optical components to a substrate; directly in the case of FIG. 3A and via the intermediary of a single mount piece in the cases of FIGS. 3B to 3H and FIG. 3J and two mount pieces in the cases of FIGS. 3I and 3K.

In each case, the overlapping contact surfaces A, A', B where the bonds are formed are illustrated hatched. Surface A is the bond surface between substrate 11 and mount piece 12. Surface B is the bond surface between mount piece 12 and the optical component (labelled with various different reference numerals with reference to FIG. 1). Surface A' is the bond surface between the mount piece 12 and additional mount piece 12' in the case that two mount pieces are used, i.e. FIGS. 3I and 3K. A light beam L is also schematically illustrated, where the light beam is reflected in the cases of FIGS. 3A to 3D and transmitted in the cases of FIGS. 3E to 3K. The optical components of FIGS. 3A and 3B may be planar mirrors (e.g. fold mirrors 6 or output coupler 10 of FIG. 1). The optical components of FIGS. 3C and 3D may be curved mirrors (e.g. concave mirrors 5, 7 and 9 of FIG. 1). The optical components of FIGS. 3E, 3F and 3G may be lens components that at least partly operates in transmission (e.g. lens 3 or output coupler 10 of FIG. 1).

In FIG. 3A, an optical component 6 is directly mounted on the substrate 11, showing that it may not be necessary or beneficial for all the optical components to be mounted with a mount piece. This can be the case when the alignment of an optical component is not very critical or if the alignment of the component can be corrected via the alignment of other components which are aligned and bonded later in the assembly process.

In FIG. 3E, an optical component 3 is mounted with one part of an external surface that forms an overlapping contact surface B bonded to the mount piece 12 and another part extending laterally beyond the mount piece 12, as viewed in the beam direction, so that a beam can pass through the optical component 3 without passing through the mount piece 12.

FIG. 3F shows a mount piece 12 with a cylindrical through-hole H, the centre axis of which is aligned with the optical axis of a lens 3 attached to the mount piece 12, so that light can pass through the lens 3 and the through-hole H. The lens 3 has a diameter greater than that of the through-hole so that a rim portion is available as an overlapping contact surface B for bonding to the mount piece 12.

FIG. 3G shows a mechanically similar arrangement to that of FIG. 3D, but for a transmission optical component 3. Light passes not only throught the optical component 3, but also throught the mount piece 12, the mount piece 12 being made from a suitably transparent material (e.g. fused silica) with appropriate surface finishes (e.g. polished and anti-reflection coated). In such a case, the bonding technology for the surface B also has to be chosen appropriately so as not to impede the beam transmission (e.g. optically transparent adhesive).

FIG. 3H shows an option where an optical component 6 is stacked on top of the mount piece 12 (instead of on a side surface as in FIG. 3B for example). Namely, the optical component 6 is bonded on a portion B of an upper surface of the mount, said surface being in the plane of the substrate 11. This approach is suitable for small optical components and ones which do not require high alignment accuracy.

FIG. 3I shows an option useful for small optical components in which a second mount piece made of a suitable material (e.g. of fused silica) is included. A small optical component 3 is attached to the second mount piece 12' (here the top surface, but it could be a side surface) to form the bond surface B (not indicated). In terms of assembly, the small optical component 3 is first bonded to the second mount piece 12' to form a two-piece sub-assembly 3, 12'. The sub-assembly 3, 12' with bond surface B is then bonded with a surface of mount piece 12 which is bonded to the substrate 11. This approach avoids potentially fiddly assembly of a small optical component on a side surface of the mount piece 12 that is to be bonded onto the substrate.

FIGS. 3J and 3K show examples of fixation of elongate cylindrical optical components 2, such as fibre collimator pigtail sub-assemblies. In FIG. 3J, the mount piece 12 has a cylindrical through-hole H dimensioned to receive and allow bonding of the cylindrical sub-assembly 2 within the through-hole H. In FIG. 3K, a similar cylindrical through-hole H is provided in a second mount piece 12' bonded to a side surface of the substrate mount piece 12, thereby allowing more alignment freedom and hence precision.

It will be appreciated that FIGS. 3A to 3K represent a non-exhaustive list of fixation possibilities.

We now describe the special considerations which apply to mounting the gain medium, saturable absorber or any other components that may generate significant amounts of heat and so require some heat dissipation measures to be adopted. In these cases, heat sinking mounts, e.g. made of copper or aluminium, may have to be used. An intermediate plate made from a low expansion metal such as Invar may then be used as a bridge between the heat sinking element and the substrate. An Invar intermediate plate is suitable for combining with a fused silica substrate, since their CTEs are almost the same, namely $0.55 \times 10^{-6}$ K$^{-1}$. Thermal expansion matching ensures that no or minimal stress is introduced into the substrate and the bonding interface as a result of changes of temperature, so that for example the risk is reduced of potential damage to the bonding interface by repeated temperature cycling. The fixation of the metal part of the optic mount (e.g. aluminium or copper) to the intermediate Invar plate can be achieved with fasteners.

Figure 4A:
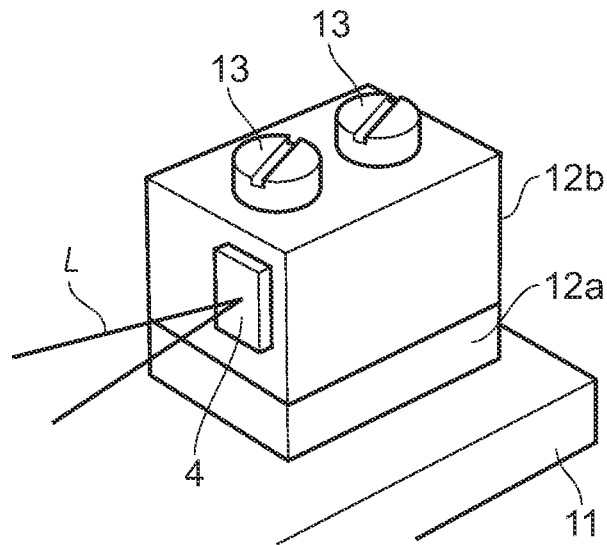
FIGS. 4A and 4B are perspective and side section views of a two-part mount for mounting a 'hot' optical component, such as a gain medium.
Figure 4B:
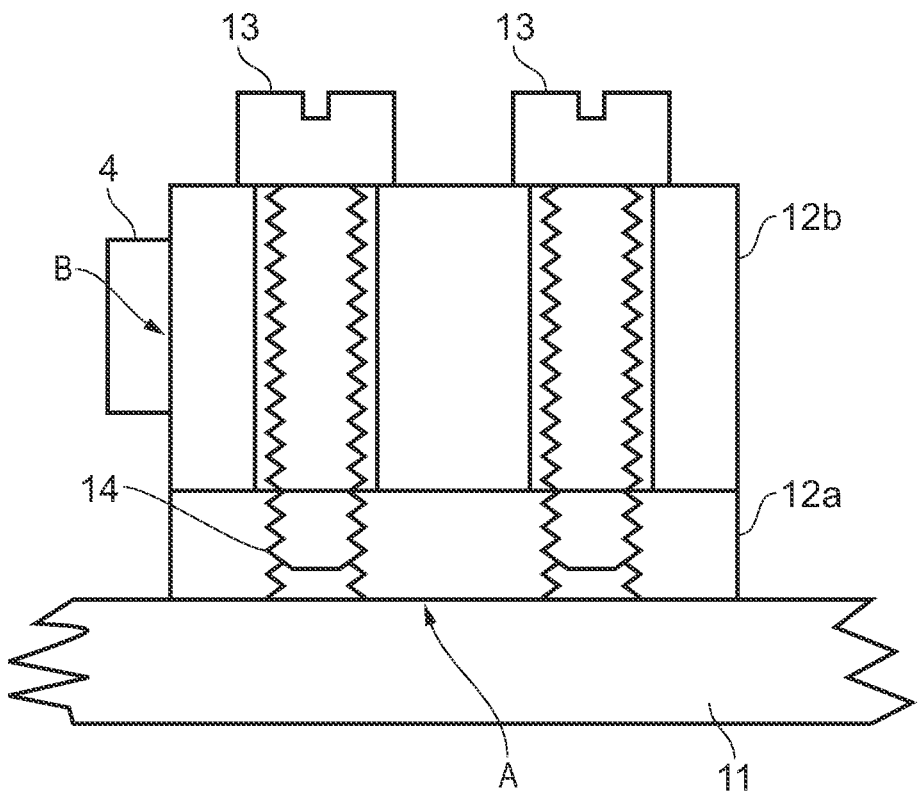

FIGS. 4A and 4B are perspective and side section views of a two-part mount for mounting a 'hot' component, such as a gain medium or saturable absorber, that is required to be attached to a heat sinking block, e.g. a metal block. The mount comprises first and second parts 12a and 12b that are fixedly connected to each other with a mechanical fastener connection. The lower part 12a is made of Invar (or a similar alloy) and bonded to the substrate 11. The upper part 12b is made of a good thermal conductor, such as copper or aluminium, and is bonded to the hot component 4. The upper, metal part 12b has two through-holes dimensioned to accept a screw 13 of a particular size, e.g. M2 or M2.5, and the lower, Invar part has two corresponding female threads 14, thereby allowing the upper and lower parts 12b and 12a to be fixedly connected to each other by suitable screws, e.g. in the manner that is illustrated using two cheese-head screws 13. It is noted that since the lower part 12a is made of Invar, it is not transparent to curing light. Nevertheless, a light-curable adhesive can still be used for interface A, provided that the substrate 11 is transparent to the curing light. The situation is similar for bonding the 'hot' component to the metal, upper block. Light-curable adhesive may still be used if the 'hot' component is transparent to the curing light. It is noted that the positions of the screw and thread could be inverted compared to the illustration, with the thread being in the upper part and the through hole in the lower part, and the screw being screwed in from below. The number of fasteners may be only one or may be more than the two that are illustrated.

Figure 5:
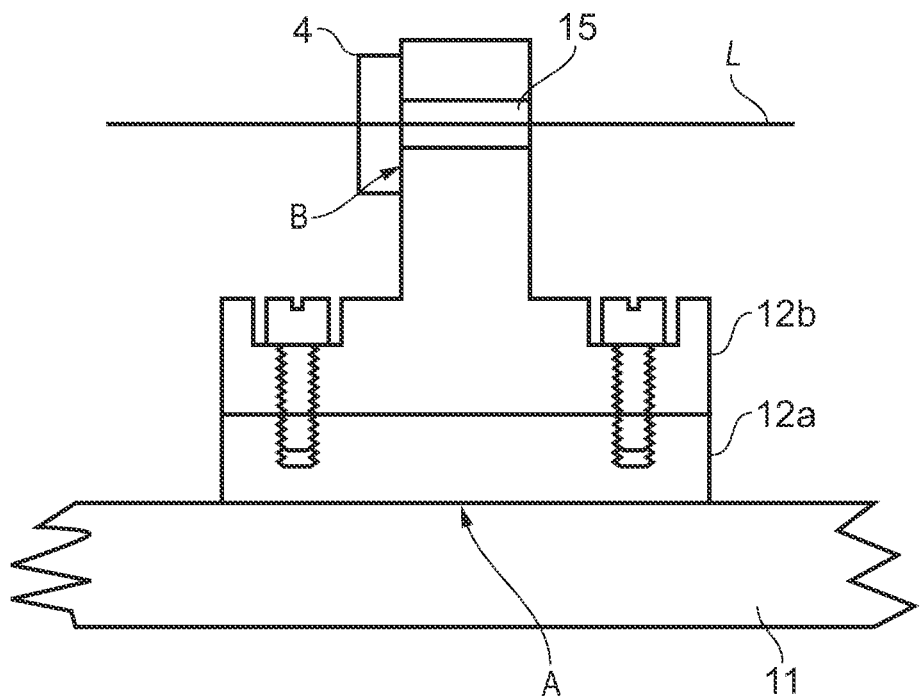
FIG. 5 is a schematic side section view of a variant of FIGS. 4A and 4B adapted for a 'hot' optical component that operates in transmission.

FIG. 5 is a schematic side section view of a variant of FIGS. 4A and 4B adapted for an optical component that operates in transmission. A lateral through-hole 15 is provided in the upper part 12b of the mount to serve as a beam path to/from the 'hot' component 4 as may be suitable for the gain medium element.

The assembly using two-part mounts such as shown in FIGS. 4A & 4B and FIG. 5 will typically be done in stages, for example as follows. The optical component 4 (e.g. gain medium element or SESAM) will be bonded to the upper part 12b. The lower part 12a will be bonded to the substrate 11. The two sub-assemblies 4/12b & 12a/11 thus formed by the respective independent bonding processes will then be joined using the screw fasteners 13 and receiving threads 14 in the lower part 12a. Alternatively, instead of screw fasteners, the upper and lower parts 12b and 12a could be connected by bonding, such as adhesive bonding.

Figure 6:
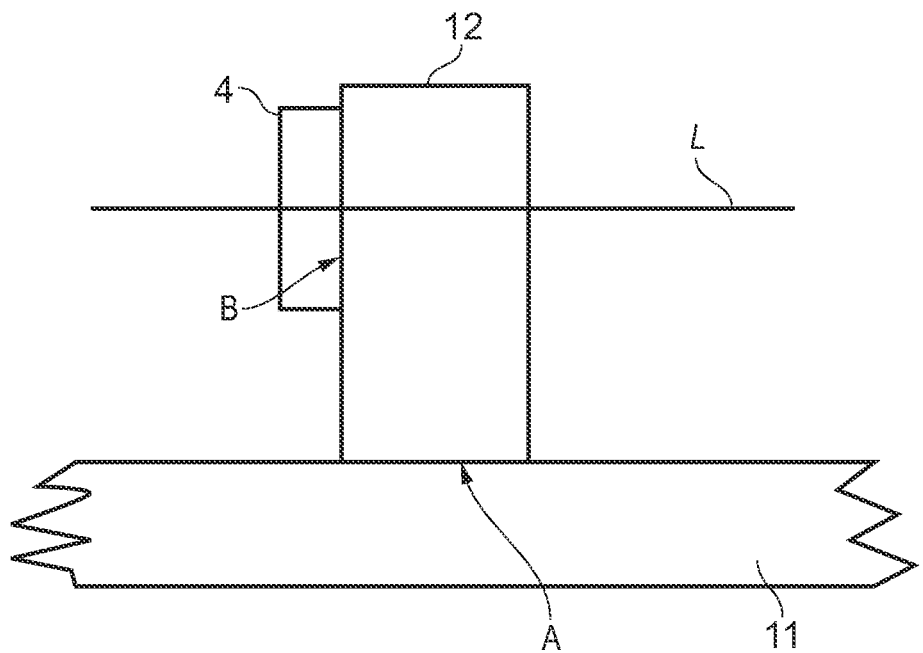
FIG. 6 is a schematic side section view of another option for mounting a 'hot' optical component that operates in transmission.

FIG. 6 is a schematic side section view of another option for mounting a 'hot' transmission optical component, in particular one that operates in transmission. The construction is as shown in FIG. 3B, but the mount is made from a material that is both transparent to the laser beam L and also a relatively good thermal conductor. The mount should have an appropriate surface finish (e.g. may be suitably polished and/or provided with an anti-reflection coating). Candidate materials are CaF2 and sapphire. Coefficient of thermal expansion matching between the mount piece 12 and the substrate 11 is not provided for, but the illustrated design may nevertheless be a good compromise when a heat sinking mount is needed, but it is desired to avoid use of a metal, or if the use of UV-curable adhesives is preferred.

Another method for the fixation of a "hot" component, such as the gain medium or the saturable absorber, is to select a material for the mount that has both a low CTE and a high thermal conductivity. The materials choice for this combination of thermal properties is however quite restricted. Possible materials are silicon carbide ceramic or silicon nitride ceramic. A "hot" optical component (e.g. the SESAM) could be fixed in a similar way as shown in FIG. 3B, where the "hot" optical component and the optic mount would be made of one of the above-mentioned ceramic materials or other materials with similar thermal properties.

As for the bonding described further above with reference to FIGS. 1 to 3, different bonding technologies can be used for assembling the structures shown in FIGS. 4 to 6 depending on the exact materials combinations, e.g. adhesive bonding with an optically transparent adhesive, molecular bonding, chemically activated direct bonding or hydroxide catalysis bonding.

Example Prototypes

The lasers we have realised to date are diode-pumped femtosecond Er:Yb:glass lasers which employ passive mode-locking with a SESAM. The mode-locking scheme we use is soliton mode-locking. Different prototypes with repetition rate between 200 MHz and 2.5 GHz have been realised. The cavity design of a 250 MHz laser is as shown in FIG. 1.

More details of the 250 MHz prototype are as follows. The laser is pumped by a fibre-coupled high-power single-emitter telecom pump diode emitting at 976 nm. The wavelength of the pump diode is stabilized using a fibre Bragg grating (FBG). The pump light is delivered via a polarization maintaining (PM) single-mode fibre 1. The pump light is collimated by a commercially available fibre collimator 2. The pump optics consists of a single plano-convex lens 3 that produces a tight focus in the Er:Yb:glass gain medium. The pump beam size in the gain medium is optimised for pump absorption, gain inversion and thermal lensing. The gain medium has a cuboid shape with two polished surfaces and is aligned at the Brewster angle for low cavity loss at the lasing wavelength, but also good pump light absorption. Two curved cavity mirrors 5 on both sides of the gain medium element 4 produce a tight focus of the laser light inside the Er:Yb:glass. The spot size of the laser beam inside the gain glass was chosen not only for best overlap with the pump light but also for producing a desired amount of SPM (self-phase modulation) to achieve stable soliton mode-locking. The angles of incidence of the laser light on the two curved mirrors 5 were optimised for astigmatism compensation; the astigmatism is mainly created by the gain medium glass under Brewster angle. The mirrors 5 have a high-reflective coating for the laser wavelength centred around 1550 nm and an anti-reflection (AR) coating for the pump wavelength at 976 nm. The backsides of the mirrors 5 are AR-coated for the pump light as well as for the laser light. Four flat mirrors 6 in the collimated parts of the laser cavity are used to fold the cavity and make the laser module more compact. Two of these mirrors are simple high-reflectors for the laser light, and the other two are GTIs (Gires-Tournois interferometers), i.e. high-reflectors with a controlled and non-zero amount of GDD (group delay dispersion), which may be referred to as dispersive mirrors. The GDD is used for the soliton mode-locking to balance the SPM induced in the gain medium by the Kerr effect. A curved mirror 7 produces a tight focus on the SESAM (semiconductor saturable absorber mirror). This mirror has a highly reflective coating for the laser light. The SESAM 8 is used for starting and stabilizing the mode-locking in the soliton mode-locking scheme. It consists of a single InGaAs quantum well acting as saturable absorber, and a GaAs/AlGaAs DBR (distributed Bragg reflector). The SESAM parameters and the laser mode size on the SESAM have to be chosen to achieve saturation. A curved high-reflectance mirror 9 for the laser light produces a focus on the flat output coupler 10. This curved mirror 9 is not necessarily needed, since the laser beam on the output coupler 10 could instead be collimated. The output coupler 10 is a partially transparent mirror for the laser light. On the backside of the output coupler 10 there is an AR coating for the laser light. The output coupler is slightly wedged to suppress etalon effects and reflections back into the laser cavity that, if present, could negatively affect the modelocking performance. The laser light emitted from the cavity is coupled into a fibre (not shown in FIG. 1) with a suitable focusing lens (also not shown in FIG. 1) producing a focus on the end-facet of a PM single-mode fibre.

Laser specifications for the 250 MHz Er:Yb:glass laser prototype are:
Average power: 120 mW
Repetition rate: 250.0 MHz
Centre wavelength: 1560.0 nm
Pulse duration: 185 fs
Spectral bandwidth: 14.0 nm
PER: >23 dB (polarization extinction ratio)
Beam quality: TEM00, M2<1.05
Timing jitter: <10 fs [1 kHz-10 MHz]

In summary, we have described a quasi-monolithic solid-state laser in which the optical components of the laser cavity are bonded to a common substrate via mounts. The optical components and their mounts are fixedly connected to each other and to the substrate solely by bonding. While the gain medium, and possibly other components such as the SESAM, are bonded to mounts made of a different material with high thermal conductivity for heat sinking, the cavity's lens and mirror components and their mounts are all made of the same material as the substrate, or alternatively a different material that is thermally well-matched to the substrate, and fixedly mounted on the substrate solely with bonding. The bonding is achieved with adhesive bonding, or some other form of bonding such as molecular bonding, chemically activated direct bonding or hydroxide catalysis bonding.

It will be clear to one skilled in the art that many improvements and modifications can be made to the foregoing exemplary embodiments without departing from the scope of the present disclosure.

The invention claimed is:
1. A solid-state laser resonator comprising:
a substrate;
a gain medium element made of a gain material;
at least a first optical component being a mirror or a lens that forms at least a part of a resonator cavity of the laser resonator;
at least a first optical component mount arranged to fixedly mount the at least first optical component on the substrate by respective bonds between the at least first optical component mount and the at least first optical component and the substrate; and
a gain medium mount arranged to fixedly mount the gain medium element on the substrate by respective bonds between the gain medium mount and the gain medium element and the substrate, and wherein the gain medium mount comprises first and second parts that are fixedly mounted to each other, the first part being made of an iron-nickel metal alloy with a coefficient of thermal expansion of less than 5×10−6 K−1 at 20° C. and including the bond to the substrate and the second part being made of a material with a thermal conductivity greater than 50 W m−1 K−1 at 20° C. and including the bond to the gain medium element, wherein each of the bonds is formed by a bonding agent selected from one or more of the group: adhesive bonding agent, molecular bonding agent, chemically activated direct bonding agent and hydroxide catalysis bonding agent, and wherein the substrate, the at least first optical component and the at least a first optical component mount are made of respective materials with coefficients of thermal expansion that are less than 3.5×10−6 K−1 and that differ from one another by less than 3.5×10−6 K−1, in both cases at a temperature of 20° C.

2. The laser resonator of claim 1, wherein the coefficients of thermal expansion of the substrate, the at least first optical component and the at least first optical component mount are all less than 3.0×10−6 K−1 and differ from one another by less than 3.0×10−6 K−1.

3. The laser resonator claim 1, wherein one or more of the substrate, the at least first optical component and the at least first optical component mount are made of fused silica.

4. The laser resonator of claim 1, wherein the substrate, the at least first optical component and the at least first optical component mount are made of a common material.

5. The laser resonator claim 1, wherein the at least first optical component includes one or more of: a focusing mirror or lens for focusing a pump beam on the gain medium element; one or more focusing mirrors or lenses for focusing a cavity mode of the resonator onto the gain medium element; one or more fold mirrors for the resonator cavity; one or more focusing mirrors or lenses for focusing a cavity mode of the resonator onto a back reflector of the cavity; one or more mirrors or lenses for directing a cavity mode of the resonator onto the output coupler; and an output coupler for the resonator cavity.

6. The laser resonator of claim 1, further comprising a saturable absorber element and a saturable absorber mount, the saturable absorber mount being arranged to fixedly mount the saturable absorber element on the substrate by respective bonds bond between the saturable absorber mount and the saturable absorber element and the substrate.

7. The laser resonator of claim 6, wherein the at least first optical component includes a focusing mirror or lens optical component for the saturable absorber element and an associated optical component mount, the focusing mirror or lens optical component being arranged to form a focus on the saturable absorber element, the associated optical component mount being arranged to fixedly mount the focusing mirror or lens optical component on the substrate by respective bonds between the optical component mount and the focusing mirror or lens optical component and the substrate.

8. The laser resonator of claim 6, wherein the saturable absorber element is a semiconductor saturable absorber mirror, SESAM.

9. The laser resonator of claim 6, wherein the saturable absorber mount comprises first and second parts that are fixedly mounted to each other, the first part being made of an iron-nickel metal alloy with a coefficient of thermal expansion of less than 5×10−6 K−1 at 20° C. and including the bond to the substrate and the second part being made of a material with a thermal conductivity greater than 50 W m−1 K−1 at 20° C. and including the bond to the saturable absorber element.

10. The laser resonator of claim 1, wherein the bonding agent is a light-curable adhesive.

11. The laser resonator of claim 1, wherein the coefficients of thermal expansion of the substrate, the at least first optical component and the at least first optical component mount are all less than 2.0×10−6 K−1 and differ from one another by less than 2.0×10−6 K−1.

12. The laser resonator of claim 1, wherein the coefficients of thermal expansion of the substrate, the at least first optical component and the at least first optical component mount are all less than 1.0×10−6 K−1 and differ from one another by less than 1.0×10−6 K−1.

13. The laser resonator of claim 1, wherein the coefficients of thermal expansion of the substrate, the at least first optical component and the at least first optical component mount are all less than 0.5×10−6 K−1 and differ from one another by less than 0.5×10−6 K−1.

14. The laser resonator of claim 1, wherein the coefficients of thermal expansion of the substrate, the at least first optical component and the at least first optical component mount are all less than 0.1×10−6 K−1 and differ from one another by less than 0.1×10−6 K−1.

15. A method of assembling a solid-state laser resonator, the method comprising:

providing a plurality of components for assembling the laser resonator including:

a substrate;

a gain medium element made of a gain material;

at least a first optical component being a lens or mirror for forming at least a part of a resonator cavity of the laser resonator;

at least a first optical component mount for fixedly mounting the at least first optical component on the substrate by respective bonds between the at least first optical component mount and the at least first optical component and the substrate;

a gain medium mount for fixedly mounting the gain medium element on the substrate by respective bonds between the gain medium mount and the gain medium element and the substrate, the gain medium mount having first and second parts that are fixedly mounted to each other, the first part being made of an iron-nickel metal alloy with a coefficient of thermal expansion of less than 5×10−6 K−1 at 20° C. and including the bond to the substrate and the second part being made of a material with a thermal conductivity greater than 50 W m−1 K−1 at 20° C.; and bonding agent selected from one or more of the group: adhesive bonding agent, molecular bonding agent, chemically activated direct bonding agent and hydroxide catalysis bonding agent, and wherein the substrate, the at least first optical component and the at least first optical component mount are made of respective materials with coefficients of thermal expansion that are less than 3.5×10−6 K−1 and that differ from one another by less than 3.5×10−6 K−1, in both cases at a temperature of 20° C.;

assembling the components into a solid-state laser resonator by:

aligning the at least first optical component;

placing the at least first optical component mount in contact with the substrate and the at least first optical component via a bonding agent;

curing the bonding agent to bond the at least first optical component to the at least first optical component mount and at least first optical component mount to the substrate;

aligning the gain medium element;

placing the gain medium mount in contact with the substrate and the gain medium element via the bonding agent;

curing the bonding agent to bond the gain medium element to the gain medium mount and the gain medium mount to the substrate.

16. The method of claim 15, wherein the bonding agent is a light-curable adhesive material, and said curing comprises exposure of the bonding agent with light.

17. The method of claim 15, wherein, prior to curing, the at least first optical component is positioned for bonding with the aid of a light beam which propagates along a lasing beam path of the resonator cavity.

18. The method of claim 15, wherein the components further comprise a saturable absorber element and a saturable absorber mount for connecting the saturable absorber element to the substrate by respective bonds between the saturable absorber mount and the saturable absorber element and the substrate, and wherein the assembly further comprises:

aligning the saturable absorber;

placing the saturable absorber mount in contact with the substrate and saturable absorber via the bonding agent;

curing the bonding agent so that the saturable absorber is fixedly mounted to the substrate via the saturable absorber mount.

19. The method of claim 15, wherein the coefficients of thermal expansion of the substrate, the at least first optical component and the at least first optical component mount are all less than $3.0 \times 10^{-6}$ K$^{-1}$ and differ from one another by less than $3.0 \times 10^{-6}$ K$^{-1}$.

20. The method of claim 15, wherein the coefficients of thermal expansion of the substrate, the at least first optical component and the at least first optical component mount are all less than $2.0 \times 10^{-6}$ K$^{-1}$ and differ from one another by less than $2.0 \times 10^{-6}$ K$^{-1}$.

21. The method of claim 15, wherein the coefficients of thermal expansion of the substrate, the at least first optical component and the at least first optical component mount are all less than $1.0 \times 10^{-6}$ K$^{-1}$ and differ from one another by less than $1.0 \times 10^{-6}$ K$^{-1}$.

22. The method of claim 15, wherein the coefficients of thermal expansion of the substrate, the at least first optical component and the at least first optical component mount are all less than $0.5 \times 10^{-6}$ K$^{-1}$ and differ from one another by less than $0.5 \times 10^{-6}$ K$^{-1}$.

23. The method of claim 15, wherein the coefficients of thermal expansion of the substrate, the at least first optical component and the at least first optical component mount are all less than $0.1 \times 10^{-6}$ K$^{-1}$ and differ from one another by less than $0.1 \times 10^{-6}$ K$^{-1}$.

* * * * *